United States Patent [19]
Gérard

[11] 4,450,516
[45] May 22, 1984

[54] DEVICE FOR CONTROLLING THE REGULATING FACILITIES IN AN ELECTRIC HIGH-POWER AC-DC CONVERTER

[75] Inventor: André Gérard, Ecquevilly, France

[73] Assignee: Compagnie Internationale pour l'Informatique CII-Honeywell Bull (Societe Anonyme), Paris, France

[21] Appl. No.: 333,769

[22] Filed: Dec. 23, 1981

[30] Foreign Application Priority Data

Dec. 30, 1980 [FR] France .................................. 80 27769

[51] Int. Cl.³ ............................................ H02P 13/26
[52] U.S. Cl. ...................................... 363/84; 363/54; 363/88; 323/281
[58] Field of Search ................................ 363/52–54, 363/84–88, 127–129; 323/280–281

[56] References Cited

U.S. PATENT DOCUMENTS

| | | | |
|---|---|---|---|
| 3,518,527 | 6/1970 | Russell ................................... | 363/88 |
| 3,562,621 | 2/1971 | Schaefer ............................ | 363/88 X |
| 4,044,295 | 8/1977 | Ferraiolo et al. ..................... | 363/54 |
| 4,074,345 | 2/1978 | Ackermann ....................... | 363/88 X |
| 4,209,738 | 6/1980 | Nuver et al. ........................ | 363/85 X |
| 4,315,305 | 2/1982 | Siemon .................................. | 363/88 |

FOREIGN PATENT DOCUMENTS

| | | |
|---|---|---|
| 2079268 | 10/1973 | France . |
| 2395544 | 1/1979 | France . |
| 1443065 | 7/1976 | United Kingdom . |

*Primary Examiner*—Peter S. Wong
*Attorney, Agent, or Firm*—Kerkam, Stowell, Kondracki & Clarke

[57] ABSTRACT

The invention relates to a device particularly adapted for use with the power supply of a computer for controlling the regulating facilities in an electric high-power AC-DC converter of the power supply.

This control device (D) comprises a regulation (CC) control comparator connected to the storage facilities (S) of the converter and receiving a reference voltage having a "nominal" value when the converter is normally powered by an AC network and receiving a portion of the output voltage from the converter, the output of said control comparator (CC) supplying an error signal to the regulating facilities (MR) of the converter. The control device also includes facilities (R) for supplying a variable reference voltage to the control comparator (CC) so that at the moment of recovery of the network following a cutoff, the voltage at the input of the filtering facilities (F) of the converter is, at the most, equal to the output voltage of the storage facilities (S).

7 Claims, 1 Drawing Figure

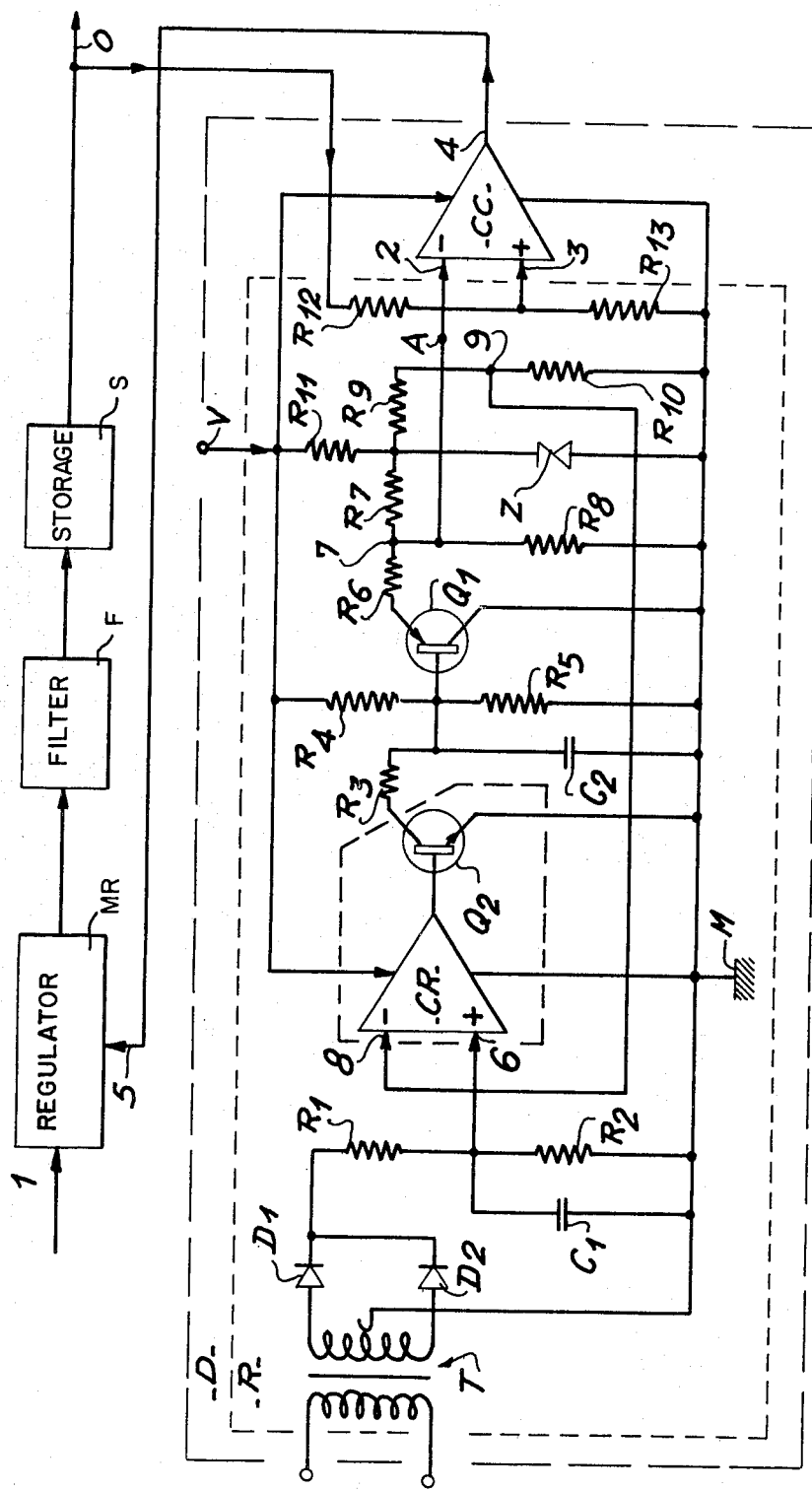

DEVICE FOR CONTROLLING THE REGULATING FACILITIES IN AN ELECTRIC HIGH-POWER AC-DC CONVERTER

The present invention relates to a device for controlling the regulating facilities in an electric high-power AC-DC converter. These converters are generally employed to supply power computers.

It is known that the generation of a regulated high-power DC voltage (e.g., 10 kW) forces the use of regulating facilities consisting largely of a rectifier bridge provided with thyristors, or a mixed-type bridge using thyristors as well as diodes. These bridges are more often than not of the 3-phase type and the regulation control is effected by acting upon the delay angle when the thyristors become conducting. To enable operation of the powered system (e.g., a computer), it is necessary to fix a minimum threshold for the regulated output voltage of the converter. It is also necessary to provide for a power reserve to guard this minimum value of the output voltage against a partial cutoff of the AC network powering the converter. As a rule, the power reserve is generated downstream of the regulating facilities at the outlet of a filter consisting, for example, of an induction coil connected to a capacitor. This power reserve is produced by a relatively large number of capacitors.

When a cutoff or mini-cutoff of the AC network powering the regulating facilities of the converter occurs, these capacitors, which have stored electric energy prior to the appearance of this cutoff or mini-cutoff, discharge in the system supplied by the converter. The recharge of these capacitors during the recovery of the AC network after a cutoff or mini-cutoff imposes abnormal stresses upon the group of converter components, more particularly, a strong flow of currents. This may lead to the tripping of a circuit breaker and, consequently, to the shutdown of the system powered by it.

It is known that the regulation control in AC-DC converters is effected by means of an error voltage supplied by a comparator which receives at least a portion of the output voltage of the energy-storing facilities on the one hand and a DC reference voltage on the other. The comparator has its own power supply and its own power reserve, which usually lasts longer than the power reserve at the converter output.

When the network is cut off, the output voltage of the energy-storing facilities diminishes in accordance with the characteristics of the powered system and with the value of the power reserve. It can reach a minimum threshold and, when the comparator detects an inadequate voltage at the output of the storage facilities, it generates an error signal, which is applied to the regulating facilities and which is intended to increase the output voltage of the storage facilities. This, then, has no effect, because the network has been cut off.

In the majority of cases, the difference between the output voltage of the storage facilities and the reference voltage is such that the operating dynamic range of the comparator is exceeded and the latter is saturated. During recovery of the AC network supplying the converter, the comparator is in a state of saturation or, at best, it limits the operation of the converter, and the regulating facilities supply a high voltage which will not diminish until the output voltage of the storage facilities has reached a normal value after stabilization of the control loop. The filtering means are then subjected to a considerable voltage jump and the resultant current can rapidly bring the induction coil of these filtering means to saturation. However, for reasons of economy, the induction coil must not be oversized, its volume being, in fact, proportional to $LI^2$ (L denoting the inductance of the inductance coil and I the current flowing therethrough). The result is that there flows at the moment of recovery of the AC network through the input of the converter a heavy current in the components of the latter. This current can cause the destruction of these components or, at best, the blowing of protective fuses usually provided between the AC network and the converter input.

Therefore, the aim of the invention is to overcome these disadvantages and, more particularly, to provide a device for controlling the regulating facilities in a high-power AC-DC converter. During cutoff and, thereafter, during recovery of the AC network powering the converter, this device prevents an excessive current from flowing through the components of the latter. This object is accomplished as a result of the device embodying the principles of the invention which, especially at the moment of recovery of the AC network, comes into action by controlling the voltage across the input of the filtering means in such a way that this input voltage is, at the most, equal to the output voltage of the storage facilities, so that the output voltage thereof increases gradually. Thus, the filter is no longer subjected to heavy stresses and the output voltage of the storage facilities can coexist with a proper operation of the powered system.

The main object of the invention is to provide a device which controls the regulating facilities in a high-power electric AC-DC converter which, in addition to the regulating facilities connected to the electric AC network, contains filtering means, one input of which is connected to an output of the regulating facilities, means for storing electric energy connected to an output of the filtering means, the regulated useful voltage being available at the output of said storage facilities, and the control device comprising a comparator for controlling the regulating facilities, one input of which is connected to the output of the storage facilities, and another input, the reference input, receives a reference voltage called the "nominal" value when the converter is normally powered by the network, the output of said control comparator delivering an error signal applied to an input which controls the regulating facilities, characterized in that it also includes reference facilities for supplying a reference voltage which can be adjusted to the control comparator, said facilities being arranged in such a manner that at the moment of recovery of the network following a cutoff, the input voltage of the filtering means is at the most equal to the output voltage of the storage facilities.

Other features and advantages of the invention will become apparent from the following description and the accompanying one-FIGURE drawing, which shows schematically a device according to the invention which enables control of the regulating facilities of an electric AC-DC converter.

DESCRIPTION OF THE PREFERRED EMBODIMENT

Referring to the drawing, the control device according to the invention is shown at D. It enables control of the regulating facilities, e.g., the control regulator, MR of an electric AC-DC converter. These regulating facilities are connected through their input 1 to the AC network (not shown) and they are usually of the 3-phase type. The converter also contains filtering means F consisting of an induction coil connected to a capacitor, not shown herein, and voltage storage facilities S for storing the regulated and filtered voltage. The output of this converter, shown at O, is the useful output for powering a system such as a computer, for example. The output O of the converter is connected in a known manner to an input 3 of a comparator CC which controls the regulating facilities pertaining to control device D. Another input 2 of this comparator receives a reference voltage, which will be described in greater detail below.

Output 4 of comparator CC is connected to an input 5, which controls regulating facilities MR. In the converters of the known type, output 4 of control comparator CC supplies an error voltage resulting from the comparison between the output voltage of storage facilities S and a fixed reference voltage. This error voltage enables control of the monitor-means (not shown) acting upon the delay angle when the thyristors of regulating facilities MR become conducting.

The reference voltage has a value called the "nominal" value when the converter is normally supplied by the AC network. The device D controlling the regulating facilities also includes, according to the invention, reference means R to ensure the supply of a reference voltage which can be varied to control comparator CC in such a way that at the moment of recovery of the network after a cutoff the voltage across the input of the filtering means F is, at the most, equal to the output voltage of storage facilities S.

As will be seen in greater detail below, reference means R are formed such as to detect a limit value x of the voltage of the electric network, for which, since regulating facilities MR are at the maximum of conduction, the average output voltage of these regulating facilities corresponds to a minimum useful output voltage of the converter below which the converter, following a network cutoff, can no longer be used to power a system. Reference means R also include facilities to enable the lowering of the reference voltage applied to an input of the control comparator CC below a predetermined value z during the cutoff time, then for gradually raising the value of this reference voltage from the predetermined value z to its nominal value at the moment of recovery of the network.

The facilities which enable the detection of the limit value x of the voltage of the network supplying the converter and for which, since the regulating means MR are at a maximum of conduction, the average output voltage of these regulating facilities corresponds to a minimum useful output voltage of the converter, comprise a reference comparator CR, one first input 6 of which receives the rectified voltage of the network across a first divider bridge having resistors $R_1$, $R_2$. Needless to say, this rectified voltage can be supplied in a known manner by a transformer T, the primary winding of which is connected to the network and the secondary winding of which supplies a rectifier bridge having diodes $D_1$, $D_2$.

The facilities which enable the determination of the limit value x of the network voltage also include an electric DC voltage source V to power the reference comparator CR, and a transistor $Q_1$ which operates either in the off-state or in the saturation state, depending on the voltage applied to its base from the output of reference comparator CR. The base of this transistor $Q_1$ is connected to the open collector output of a transistor $Q_2$ of reference comparator CR. The base of transistor $Q_2$ receives the output signal from the comparator CR, and the emitter of the transistor is connected to the reference ground M, while the collector is connected to the base of transistor $Q_1$ through a resistor. In practice, component manufacturers enclose this transistor in the same case as that enclosing the comparator, as indicated by the dotted lines in the FIGURE.

The emitter of transistor $Q_1$, which changes rapidly from the off-state to the saturation state and gradually from the saturation state to the off-state, is connected to reference voltage V on the one hand and to reference input 2 of the control comparator CC, on the other, by means of a second divider bridge comprising resistors ($R_9$, $R_{10}$) which is likewise connected to the reference ground M.

Other circuits including especially resistors, which will be described in greater detail below, are likewise connected to the emitter of transistor $Q_1$. The collector of this transistor is connected to reference ground M. A point (9) common to resistors $R_9$, $R_{10}$ of the second divider bridge is connected to a second input 8 of the reference comparator CR.

As will be seen in greater detail further below, the value of resistors $R_1$, $R_2$, $R_9$, $R_{10}$ of the first and second divider bridges enable determination of the limit value x of the supply voltage of the network for which the average output voltage of the regulating facilities corresponds to a minimum useful output voltage of the converter. When the network voltage powering the converter exceeds this limit value x, the output of reference comparator CR is at a high level in relation to the reference ground M, and the transistor $Q_1$ is in the off-state.

Reference input 2 of control comparator CC is connected to the emitter of transistor $Q_1$ through a third divider bridge comprising two resistors $R_7$, $R_8$. The common terminals of these resistors denoted by the sole reference 7 are connected to the emitter of transistor $Q_1$ through resistor $R_6$ and to reference input 2 of control comparator CC. The other terminals of these resistors are connected to DC voltage source V and reference M, respectively. The means for detecting the limit value x of the network voltage powering the converter also include facilities, which will be described in detail further below, for controlling the base-collector voltage of transistor $Q_1$. These control facilities are provided to lower the value of the current flowing through the resistor $R_8$ when the AC network voltage drops below the limit value x. They also enable the gradual increase in the value of the current flowing through this resistor $R_8$ when the network voltage exceeds the limit value x until the reference voltage reaches the nominal value mentioned above.

The facilities for controlling the transistor $Q_1$ include a capacitor $C_2$ connected between the reference ground M and the base of transistor $Q_1$, and to a first resistor $R_3$ which connects to the open collector output of transistor $Q_2$ of comparator CR. A second resistor $R_6$ connects the emitter of transistor $Q_1$ to the common terminals 7 of resistors $R_7$, $R_8$ of the third divider bridge. Capacitor $C_2$ discharges rapidly through the collector of $Q_2$ and the first resistor $R_3$ when the network voltage drops below the limit value x. Consequently, the current flowing through the resistor $R_8$ of the third divider bridge is deflected into the second resistor $R_6$, thus lowering the potential across point A and, thereby, the value of the reference voltage applied to the input 2 of the control comparator CC. This condition persists as long as the value of the AC network voltage remains below the limit value x.

On the other hand, when the AC network is restored and the value of the average voltage exceeds the limit value x, the capacitor $C_2$ recharges gradually so that the value of the deflected current in the second resistor $R_6$ decreases, because the potential of the base of transistor $Q_1$ is lowered. The result is that this decrease in the value of the current through the second resistor $R_6$ is accompanied by an increase in the value of the current through the resistor $R_8$ of the third divider bridge. This increase is accompanied by an increase in the potential of point A and, thus, by an increase in the reference voltage applied to the reference input 2 of the comparator CC.

The output O of the energy-storing facilities S is connected to an input of the reference comparator CR through a fourth divider bridge $R_{12}$, $R_{13}$, which enables a fraction of this output voltage of the storage elements to be applied to this input. The terminal of the resistor $R_7$ of the third divider bridge $R_7$, $R_8$, which is connected to the DC voltage source V, is coupled to this source through a resistor $R_{11}$. This terminal is moreover connected to the reference ground M through a Zener diode Z, which enables the mominal value of the reference voltage to be fixed when the network voltage during normal operation exceeds the limit value x.

Finally, the base of transistor $Q_1$ is connected, respectively, to DC voltage source V and reference ground M through two resistors $R_4$, $R_5$ which enable the charging time of capacitor $C_2$ to be fixed. A decoupling capacitor $C_1$ is connected in parallel with the resistor $R_2$ of the first divider bridge.

The device according to the invention operates as follows. The choice of the values of the resistors $R_1$, $R_2$, $R_9$, and $R_{10}$ enables determination of the limit value x of the network voltage, for which the output of the reference comparator CR, at the collector of $Q_2$, changes its level.

The output of this comparator is at a high level when the network operates normally, that is to say, when its voltage is higher than the limit value x. In this case, transistor $Q_1$ is in the off-state and the reference voltage appearing at point A is fixed at a value z as a result of the relationship between the values of the resistors $R_7$, $R_8$ of the third divider bridge. This reference voltage at point A is compared with a portion of that across the fourth divider bridge $R_{12}$, $R_{13}$ corresponding to a fraction of the output voltage of the storage facilities S by the control comparator CC.

When the average voltage of the power line energizing the converter drops below the limit value x, the output of the reference comparator CR goes to a low level and the capacitor $C_2$ discharges through the low-value resistor $R_3$ and the transistor $Q_2$ of the reference comparator CR. The voltage at the emitter of the transistor $Q_1$ closely follows the emitter-base voltage, which is controlled by the voltage across the terminals of the capacitor $C_2$. The result of discharging capacitor $C_2$ is that transistor $Q_1$ is turned on and resistor $R_6$ deflects a fraction of the current which flows through the third divider bridge $R_7$, $R_8$ to transistor $Q_1$. Consequently, the potential at point A diminishes and this decrease persists as long as the value of the network voltage remains below the limit value x.

When the value of the network voltage energizing the converter next exceeds the limit value x, the output voltage of the reference comparator CR goes to a high level and the capacitor $C_2$ recharges gradually through the resistor $R_4$. The recharging time is a function of the time constant of the circuit made up by the capacitor $C_2$ and the resistor equivalent to the resistors $R_4$ and $R_5$ connected in parallel. The current through the resistor $R_6$ diminishes gradually because the potential of the base of transistor $Q_1$ increases as a result of the charging of the capacitor C2. Consequently, the current through the resistor $R_6$ decreases to a value of zero corresponding to the blocking of transistor $Q_1$. During this period, the potential across point A increases to its nominal value determined by the voltage of the Zener diode Z and the attenuation ratio of the bridge made up by the resistors $R_7$ and $R_8$. At that instant, the output voltage of the storage facilities S corresponds to the nominal output voltage of the converter when the latter is powered normally by the AC network.

It will be understood that in the device described herein, the facilities employed could have been replaced by equivalent means without departing from the principles and spirit of the invention, the scope of which is defined by the appended claims.

I claim:

1. For use with an AC-DC converter of the type comprising regulator means having an input connected to an AC voltage network for producing a regulated voltage, filter means connected to an output of the regulator means, and voltage storage means connected to an output of the filter means and providing a DC output voltage from the converter, control apparatus comprising a control comparator responsive to a first voltage related to the output voltage from the converter and to a reference voltage for generating an error signal for controlling the regulator means so as to limit the level of the regulated voltage applied to the filter means upon the first voltage being greater than the reference voltage, the reference voltage having a predetermined nominal value when the converter is normally powered by the AC network, means connected to the AC network for detecting a limit value of the AC voltage of the network corresponding to a cutoff of the AC network and below which the converter is incapable of supplying a useful output voltage to a load, and reference means connected to the control comparator and to the detecting means for generating said reference voltage and for supplying the reference voltage to the control comparator, the reference voltage generating means including means responsive to the AC voltage decreasing to said limit value for decreasing the reference voltage to another predetermined value below said predetermined nominal value and, upon the AC network voltage subsequently increasing above said limit value upon recovery of the network, gradually increasing the reference voltage to said predetermined nominal value so as to limit the regulated voltage applied to the filter means at the moment of recovery to be at most equal to the output voltage from the converter.

2. Apparatus according to claim 1, wherein the detecting means comprises first means connected to the AC network for producing another DC voltage corresponding to the average value of the AC voltage of the network, second means for producing a second reference voltage corresponding to said limit value, and a reference comparator for comparing said other DC voltage and said second reference voltage and for providing a comparison signal representative of the difference therebetween, and wherein the reference voltage generating means comprises a transistor having an output connected to a reference voltage input of the control comparator for supplying said first-mentioned reference voltage thereto, and a resistor and a capacitor connected to an output of the reference comparator and to a base of the transistor for controlling the reference voltage output of said transistor in accordance with the voltage across the capacitor, the reference comparator being operative to discharge rapidly the capacitor upon the AC voltage decreasing below said limit value in order to decrease the output voltage of the transistor to said other predetermined value and, upon the AC voltage subsequently increasing above the limit value, being operative to enable the voltage across the capacitor to increase, said resistor and said capacitor having values selected to provide a time constant that limits the rate of increase of the voltage across the capacitor to a gradual increase, thereby providing a gradually increasing reference voltage to the control comparator.

3. Apparatus according to claim 1, wherein the means for detecting the limit value of the the network voltage comprises a reference comparator having a first input which receives a fraction of a rectified voltage of the network across a first divider bridge, an electric DC voltage source for powering the reference comparator and the control comparator, a transistor operating either in an off-state or in a saturation state and going gradually from the saturation state to the off-state, a base of said transistor being connected to an output of the reference comparator, an emitter of said transistor being connected to the DC voltage source, a second divider bridge which is connected between the emitter of the transistor and a reference ground, the second bridge being connected to a second input of the reference comparator, a collector of the transistor being connected to the reference ground, the first and second divider bridges determining the limit value of the network voltage above which limit value the output voltage of the reference comparator is at a high level in relation to the reference ground and the transistor is in the off-state, the reference input of the control comparator being connected to the emitter of the transistor through a third divider bridge connected to the emitter of the transistor and to the reference input of the control comparator, and between the DC voltage source and the reference ground, and wherein the means responsive to the AC voltage decreasing to the limit value includes means for controlling the transistor so as to decrease the value of current flowing through the third divider bridge when the network voltage drops below the limit value and to increase gradually the value of current flowing through said third divider bridge when the network voltage exceeds the limit value, until the reference voltage reaches the predetermined nominal value.

4. Apparatus according to claim 3, wherein the controlling means comprises a capacitor connected between the reference ground and the base of the transistor, a first resistor connecting the output of the reference comparator to the base of the transistor and a second resistor connecting the emitter of the transistor to the third divider bridge, the capacitor discharging gradually through the first resistor when the network voltage drops below the limit value, so that the current flowing through the third divider bridge is gradually deflected in the second resistor, said capacitor recharging gradually when the network voltage exceeds the limit value, so that the value of the current deflected in the second resistor decreases and the value of the current flowing through the third divider bridge increases.

5. Apparatus according to claim 4, wherein the output voltage of the voltage storage means is connected to an input of the reference comparator through a fourth divider bridge.

6. Apparatus according to claim 5, wherein the third divider bridge is connected to the DC voltage source through a third resistor and is connected to the reference ground through a Zener diode which establishes the predetermined nominal value of the reference voltage.

7. Apparatus according to claim 6, wherein the base of the transistor is connected to, respectively, the DC voltage source and the reference ground through two other resistors, which enable the charging and discharging times of the capacitor to be fixed.

* * * * *